(12) United States Patent
Strobel

(10) Patent No.: US 8,496,127 B2
(45) Date of Patent: Jul. 30, 2013

(54) METHOD FOR PRODUCING A STACKING COLUMN

(75) Inventor: Gustav Strobel, Bad Saulgau (DE)

(73) Assignee: MTS Maschinenbau GmbH, Mengen (DE)

( * ) Notice: Subject to any disclaimer, the term of this patent is extended or adjusted under 35 U.S.C. 154(b) by 671 days.

(21) Appl. No.: 12/668,241

(22) PCT Filed: Jul. 7, 2008

(86) PCT No.: PCT/EP2008/005517
§ 371 (c)(1),
(2), (4) Date: May 26, 2010

(87) PCT Pub. No.: WO2009/007078
PCT Pub. Date: Jan. 15, 2009

(65) Prior Publication Data
US 2011/0062102 A1    Mar. 17, 2011

(30) Foreign Application Priority Data
Jul. 9, 2007 (DE) .......................... 10 2007 031 997

(51) Int. Cl.
*A47F 5/08* (2006.01)

(52) U.S. Cl.
USPC ........................................ 211/150

(58) Field of Classification Search
USPC ................... 211/150, 54.1, 194, 41.1, 41.15,
211/183, 13.1, 169, 41.14, 70, 168, 170,
211/171, 70.4, 49.1, 149, 164; 312/42, 45,
312/49, 50, 60, 72, 73
See application file for complete search history.

(56) References Cited

U.S. PATENT DOCUMENTS

| 4,605,131 | A | * | 8/1986 | Debus et al. | 211/90.02 |
| 5,217,121 | A | | 6/1993 | Walker | |
| 5,301,824 | A | * | 4/1994 | Schoeller | 211/150 |
| 5,373,756 | A | * | 12/1994 | Schoeller | 74/527 |
| 5,938,051 | A | * | 8/1999 | Scholler et al. | 211/150 |
| 5,988,777 | A | * | 11/1999 | Schoeller | 312/9.58 |
| 6,234,743 | B1 | * | 5/2001 | Strobel | 414/788.1 |
| 6,405,883 | B1 | * | 6/2002 | Schambach | 211/150 |
| 7,070,058 | B2 | * | 7/2006 | Strobel | 211/150 |
| 7,210,892 | B2 | * | 5/2007 | Strobel | 414/788.1 |
| 7,878,343 | B2 | * | 2/2011 | Strobel | 211/150 |
| 2004/0050813 | A1 | * | 3/2004 | Strobel | 211/150 |
| 2005/0035691 | A1 | * | 2/2005 | Strobel | 312/42 |
| 2006/0226102 | A1 | * | 10/2006 | Strobel | 211/150 |
| 2007/0152544 | A1 | * | 7/2007 | Strobel | 312/9.58 |

FOREIGN PATENT DOCUMENTS

| DE | 3811310 | 10/1989 |
| DE | 4020864 | 1/1992 |
| DE | 9408344 | 9/1994 |
| DE | 29809118 | 12/1998 |
| DE | 29823650 | 9/1999 |
| DE | 29914281 | 11/1999 |
| DE | 20319883 | 4/2004 |

(Continued)

*Primary Examiner* — Joshua J Michener
*Assistant Examiner* — Devin Barnett
(74) *Attorney, Agent, or Firm* — Bachman & LaPointe, P.C.

(57) ABSTRACT

A method for producing a stacking column (P) for storing storage items above or alongside one another on pawls (13) which are arranged between two side walls (1, 2) such that they can rotate about an axis (12), the side walls (1, 2), pawls (13) and mounting brackets (7) form an assembly for producing stacking columns (P) of varying pitch.

5 Claims, 2 Drawing Sheets

FOREIGN PATENT DOCUMENTS

| | | |
|---|---|---|
| DE | 202004007780 | 9/2004 |
| DE | 202005002565 | 5/2005 |
| DE | 102004033216 A1 * | 2/2006 |
| DE | 202006005945 | 7/2006 |
| DE | 102005005363 | 8/2006 |
| EP | 0536571 | 4/1993 |
| EP | 0542109 | 5/1993 |
| EP | 0604337 | 6/1994 |
| EP | 2022733 A1 * | 2/2009 |
| WO | 03/003551 | 1/2003 |
| WO | WO 2005012142 A2 * | 2/2005 |
| WO | 2007137832 | 12/2007 |
| WO | WO 2009156116 A1 * | 12/2009 |

* cited by examiner

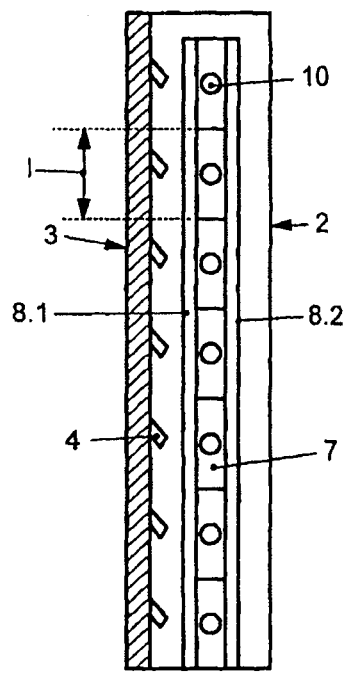
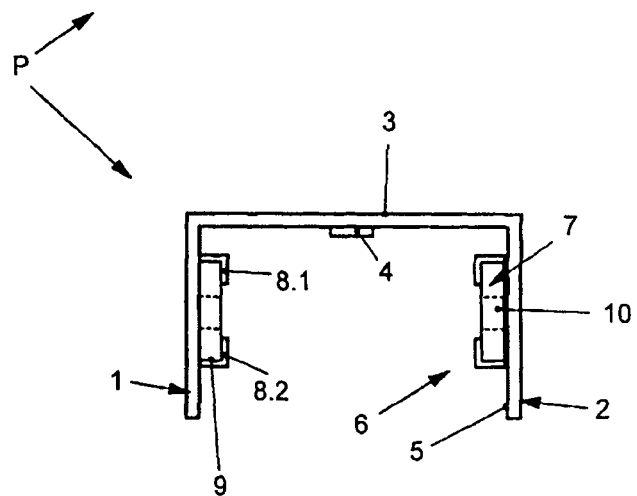

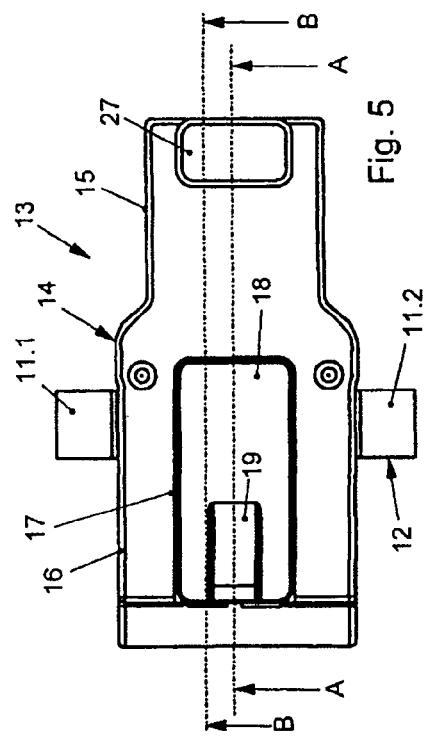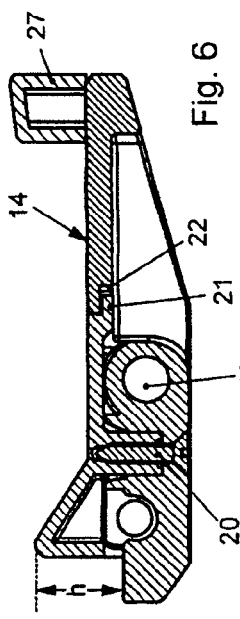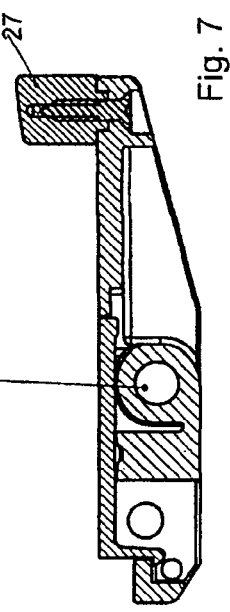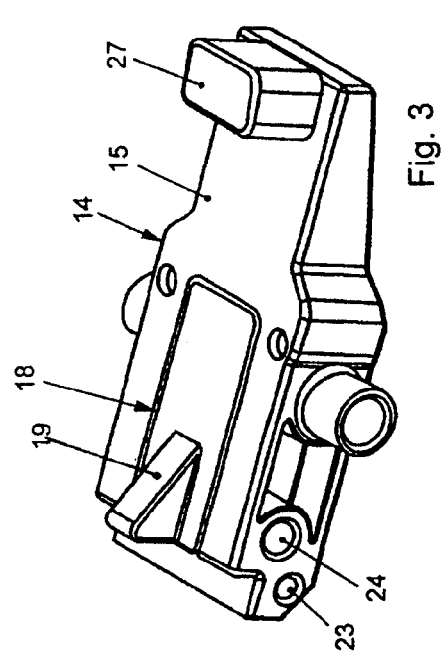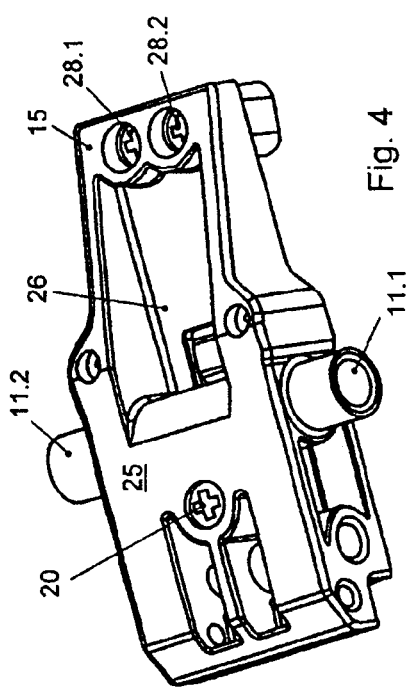

METHOD FOR PRODUCING A STACKING COLUMN

BACKGROUND OF THE INVENTION

The invention refers to a method for producing a stacking column for storing storage items one above the other or next to each other on pawls which are rotatably arranged around a pivot between two side cheeks, and also to a kit for producing a corresponding stacking column and pawls for use in such stacking columns.

Stacking columns are known in multifarious forms and on the market. Stacking columns are used primarily during the production of body parts in the automobile industry. The corresponding body parts are taken from the presses via robots and before further processing are intermediately stored in stacking columns. As a rule, four stacking columns are set up in a rectangle. Each stacking column has a multiplicity of pawls which are arranged one above the other. A first pawl in this case is mostly located in the stand-by position. If a storage item is laid upon this pawl, the pawl pivots into the working position and in the process drives a subsequent pawl which in this way gets into the stand-by position. Such a stacking column is known for example from DE 38 11 310 C1.

Stacking columns are also used, however, for the horizontal storage of storage items, as is described for example in DE 40 20 864 A1. The principle of operation of these horizontal stacking columns is similar to that of the vertical stacking columns.

The spacing of the pawls constitutes a significant problem in stacking columns. Different storage items also require a different spacing. For this, in WO 03/03551 A1 for example, ovision is made for the pawls to be interconnected at least via a link plate, wherein for reduction of a spacing of adjacent pawls at least one link plate is formed in an angled or cranked or arc-shaped configuration.

It is the object of the present invention to develop a method for producing a stacking column by means of which stacking columns of different desired spacings can be produced considerably easier.

SUMMARY OF THE INVENTION

The effect of side cheeks, pawls and bearing blocks forming a kit for producing stacking columns with different spacing leads to the achieving of the object.

This means that there is no longer a rigid production of stacking columns, but that stacking columns can be adapted by the manufacturer and/or customer to the requirements of the customer, especially as far as the spacing is concerned. In this case, provision is made for the side cheeks to always remain the same, whereas the pawls and bearing blocks can vary. Also, in the case of the bearing blocks it can be desirable that these remain the same, but that their distance from one another is altered by means of spacers. As a result of this, a different spacing again ensues.

So that the bearing blocks or spacers can be associated with the side cheeks, these side cheeks must have guides. For the sake of simplicity, the guide is formed by means of two angle-pieces which between them form an undercut slot or a channel. The bearing blocks and, if applicable, spacers, can then be simply inserted into this channel or into the slot. They can also be removed just as simply from the slot and be substituted by other bearing blocks and/or spacers. As a result of this, an accurate adaptation to the desired spacing is carried out.

The bearing blocks serve for the retention of the pawls. Therefore, they have holes for accommodating corresponding pivot ends of the pawl pivots, wherein the bearing blocks are pushed onto these pivot ends and then inserted into the slots of the side cheeks.

Furthermore, provision is made for a rotational movement of the pawl between the side cheeks to be limited. For this, stops can project either from the side cheeks or from a back wall, as are described for example in DE 298 09 118 U1.

A kit consisting of side cheeks, pawls and bearing blocks and, if applicable, spacers for producing stacking columns with different spacing for storing storage items one above the other or next to each other on pawls which are rotatably arranged around a pivot between two side cheeks, is claimed by the invention. This kit for example can be made available to a customer for producing stacking columns, wherein different pawls, bearing blocks of different length and corresponding spacers are also supplied to the customer at the same time. Only the side cheeks with the guides remain the same.

Furthermore, protection is desired for a stacking column for storing storage items one beneath the other or next to each other on pawls which are rotatably arranged around a pivot between two side cheeks, wherein the pivots of the pawls are accommodated in bearing blocks which are removably or exchangeably associated with the side cheeks. In order to bring the respective pawl in such a stacking column from a neutral position into a stand-by position and from a stand-by position into a working position, the pawls can be interconnected via corresponding link plates or other jointed connections.

In order to also simplify this function here, however, a special pawl has been developed for which protection is independently desired. Such a pawl, as is generally customary, comprises a carrier arm and a control arm. According to the invention, an insert, which is exchangeable in design, is now provided in the control arm. In this way, a height of this insert can be adapted to a desired spacing. For this, a wedge-shaped projection preferably projects from the insert, the height of which projection varies depending upon the insert which is used.

Furthermore, a very wide variety of different attachments or extensions can be located on the carrier arm or attached to the carrier arm which can take into consideration the respective desires of the user. It is also conceivable as a result of this for the pawl itself to be extended, or for it to be able to be coated for example with a wear-resistant coating. Furthermore, it is conceivable for an extension to project downwards from the pawl, which extension presses onto a storage item on a carrier arm of a pawl lying beneath it and clamps this storage item.

In the case of this pawl according to the invention, it is particularly also conceivable for the actual basic body, which can always be used again, to be produced in one piece together with the pivot ends. For this, production in a casting process or injection molding process from plastic lends itself.

BRIEF DESCRIPTION OF THE DRAWINGS

Further advantages, features and details of the invention result from the subsequent description of preferred exemplary embodiments and also with reference to the drawing; in this drawing FIG. 1 shows a side view of a part of an open stacking column;

FIG. 2 shows a plan view of parts of a stacking column according to the invention;

FIG. 3 shows a perspective plan view of a pawl according to the invention;

FIG. 4 shows a perspective bottom view of the pawl according to FIG. 3;

FIG. 5 shows a plan view of the pawl according to the invention according to FIG. 3;

FIG. 6 shows a longitudinal section through the pawl according to FIG. 5 along line A-A;

FIG. 7 shows a longitudinal section through the pawl according to FIG. 5 along line B-B.

DETAILED DESCRIPTION

A stacking column P according to the invention, according to FIGS. 1 and 2, has two side cheeks 1 and 2 which are interconnected by means of a back wall 3. A multiplicity of stops 4 are disengaged from the back wall 3, as is described in more detail in DE 298 09 118 U1.

According to the invention, a guide 6 for bearing blocks 7 is provided in each case on each inner wall 5 of the two side cheeks 1 and 2. Each guide 6 in this case comprises two angle-pieces 8.1 and 8.2 which are arranged in a mirror-image manner and so form an undercut slot 9 for the guiding of the bearing blocks 7.

A hole 10 which serves for accommodating pivot ends 11.1 or 11.2 of a pivot 12 and of a pawl 13 is formed in each bearing block 7. A corresponding pawl 13 is shown in FIGS. 3 to 7.

The pawl 13 has a basic body 14 which forms a carrier arm 15 one side of the pivot 12 and forms a control arm 16 on the other side of the pivot 12. In this case, the basic body 14 and the pivot 12 or the pivot ends 11.1 and 11.2 are preferably produced in one piece from plastic in a casting process or injection molding process.

A recess 17, in which an insert 18 is exchangeably seated, is formed in the control arm 16 and reaches over the pivot 12. A wedge-shaped projection 19 projects from this insert 18. The insert 18 itself is connected by means of a screw 20 to the basic body 14, wherein it still engages by a front strip 21 in a slot 22 which is formed in the basic body 14.

More holes 23 and 24 are furthermore to be seen on the control arm 16 and can serve for example for accommodating weights by which a pawl 13 can be returned to its neutral position between the two side cheeks 1 and 2.

A recess 26, which extends from a lower surface 25 of the pawl 13, is formed in the carrier arm 15. This serves for example for accommodating an also exchangeable attachment 27 on the carrier arm 15 providing the pawl 13 which lies beneath it is in the neutral position. This attachment 27 is connected by two screws 28.1 and 28.2 to the carrier arm 15.

The principle of operation of the present invention is as follows:

An operable stacking column of a desired spacing is produced by corresponding bearing blocks 7 being pushed onto the pivot ends 11.1 and 11.2 of the pawls 13 and together with these pawls 13 being inserted into the guides 6. A length l of the bearing blocks 7 in this case is selected so that a desired spacing is achieved.

If a stacking column P is to be produced with a different spacing, then the existing bearing blocks 7 with the corresponding pawls can be pushed out of the guides 6 and substituted by bearing blocks of a different length. It is also conceivable, however, for the bearing blocks 7 to always have a similar length but for spacers to be inserted between two bearing blocks so that by means of these spacers a corresponding spacing of the holes 10 and consequently of the pivots 12 of the pawls 13 is achieved.

It is conceivable, and also lies within the scope of the invention, for a series of stacking columns to be provided with corresponding bearing blocks for a desired spacing, but for another series of stacking columns to be provided with bearing blocks for a different spacing. It is also conceivable for the entire arrangement to be offered to a customer with various bearing blocks or spacers so that the customer himself can assemble a stacking column. The pawls in this case can be the same or different; pawls which differ in length can especially be offered.

The projection 19 of the insert 18 principally serves for bringing a subsequent pawl from a neutral position into a stand-by position and from the stand-by position into a working position, as is especially described in DE 38 11 310 C2. Therefore, the height h of the projection 19 must also be matched to a desired spacing.

The attachment 27 is also exchangeable and can be adapted to desired requirements. By means of corresponding attachments or extensions the carrier arm 15 of the pawl 13 can either be extended or made more resistant to wear. Furthermore, it is also conceivable to affix an extension on the lower surface 25 of the carrier arm 15, which extension projects downwards and presses a storage item, which lies on the lower pawl, onto the carrier arm of this pawl.

The invention claimed is:

1. A stacking column for storing storage items one above the other or next to each other comprising pawls (13) which are rotatably arranged around a pivot (12) between two substantially parallel side cheeks (1, 2), the pivot (12) of the pawls (13) is accommodated in bearing blocks (7) which are removably coupled to the side cheeks (1, 2), and a guide (6) for the bearing blocks (7) is provided on an inner wall (5) of at least one side cheek (1, 2), wherein the guide (6) comprises an undercut slot (9) into which a multiplicity of the bearing blocks (7) are inserted.

2. The stacking column as claimed in claim 1, wherein the undercut slot (9) is formed by means of two angle-pieces (8.1, 8.2) which are arranged in a mirror-image manner.

3. The stacking column as claimed in claim 1, wherein the bearing blocks (7) have holes (10) for accommodating the pivot (12) of the pawls (13).

4. The stacking column as claimed in claim 1, wherein the two side cheeks (1, 2) are interconnected via a back wall (3) on which stops (4) for the pawls (13) are provided.

5. The stacking column as claimed in claim 1, wherein the pawls (13) are interconnected via link plates which effect a rotation of the pawls (13) from a neutral position to a stand-by position and thereafter to a working position.

\* \* \* \* \*